UNITED STATES PATENT OFFICE.

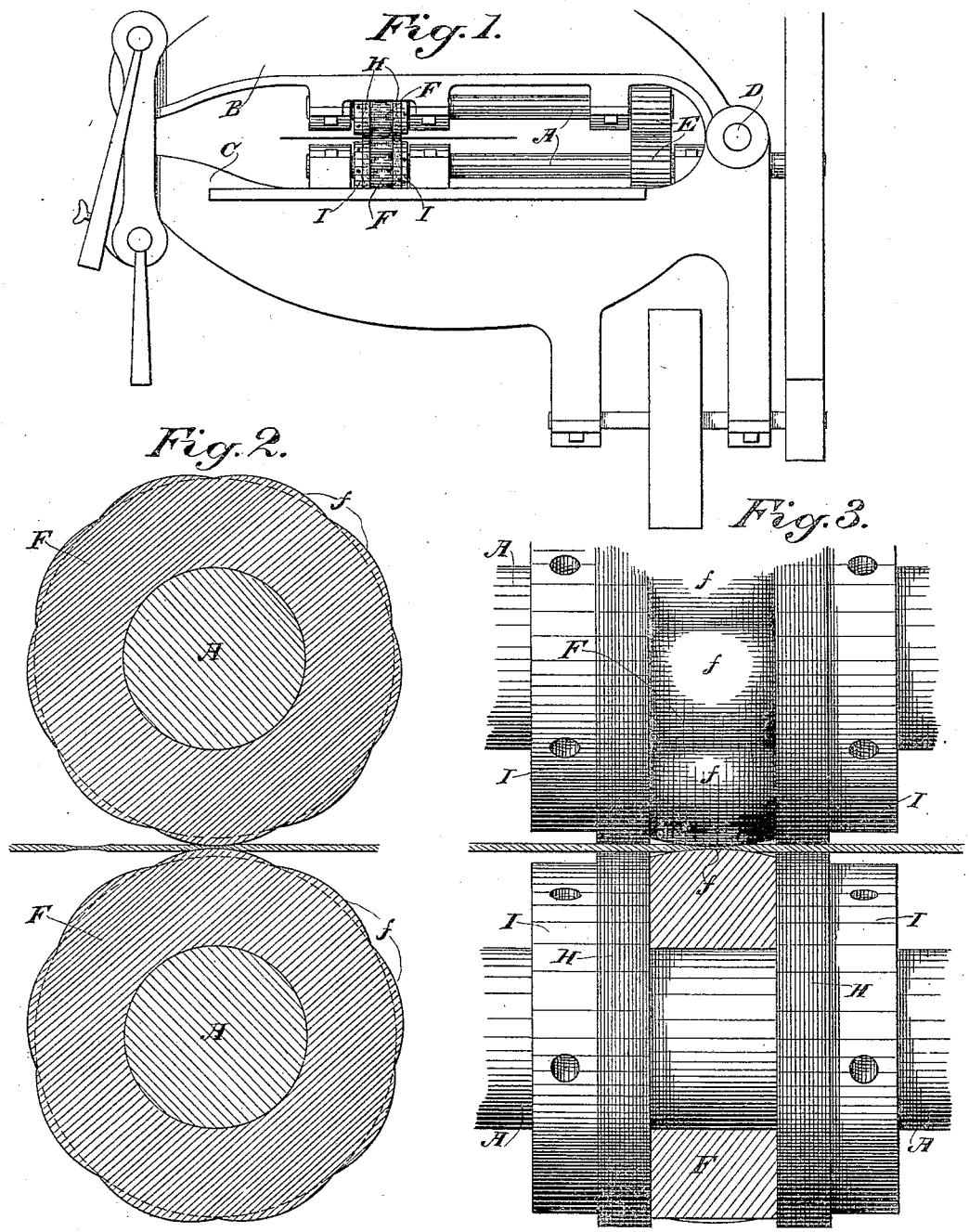

WILLIAM HOLLINGSWORTH AND JOSEPH KORBEL, OF SAN FRANCISCO, CALIFORNIA.

MACHINE FOR STRETCHING BAND-SAWS.

SPECIFICATION forming part of Letters Patent No. 529,551, dated November 20, 1894.

Application filed June 11, 1894. Serial No. 514,234. (No model.)

*To all whom it may concern:*

Be it known that we, WILLIAM HOLLINGSWORTH and JOSEPH KORBEL, citizens of the United States, residing in the city and county of San Francisco, State of California, have invented an Improvement in Band-Saw Stretchers; and we hereby declare the following to be a full, clear, and exact description of the same.

Our invention relates to a device which we call a band saw stretcher.

It consists in certain details of construction which will be more fully explained by reference to the accompanying drawings, in which—

Figure 1 is a view of our apparatus showing its application. Fig. 2 is a vertical section through the center of the rollers. Fig. 3 is a face view of the rollers, the lower being shown in section.

The object of our invention is to provide a device for stretching band saws as may be needed from time to time. These saws, while at work, are apt to become stretched or elongated, especially upon the front or cutting edge, while the remaining and central portion of the saw in particular, not being correspondingly stretched, strains come upon the saw which prevent its working satisfactorily. It is, therefore, necessary to stretch the saw, as it is termed, and equalize the strains and pressure. This is sometimes done by hammering, and sometimes by means of rollers between which the saw passes, and which act to stretch it in lines which extend the whole length of the saw, and which stretching is thus effected without reference to the points which may or may not need it. The tension between these roll marks is all longitudinal, which causes the saw to buckle. When the saw is hammered, unless great care is taken, indentations are made where the stroke of the hammer takes place, and even a corresponding bulging of the saw upon the opposite side.

By our invention the saw is stretched by compression at a great number of points or centers, so that there is practically a tension or pressing outward from all these centers, while there remain intermediate lines of metal in a natural condition between these centers, which act as ties to draw the parts together against this outward pressure. This gives the saw what is called a lively character and an even tension.

In our invention we employ arbors A which are journaled in a frame B, C, jointed as shown at D, so that the upper part of the frame B may be opened and lifted about the hinge, and one of the rollers moved away from the other, or when it is closed and locked, the two rollers travel as closely together as may be desired. Upon these arbors are fixed spur pinions E which engage with each other and cause the arbors to rotate simultaneously. Power is applied to one of these arbors by any suitable exterior gearing of sufficient power. Upon these arbors are keyed the rollers F. These rollers are slightly crowned in the center, and this crowning surface $f$ is then depressed at intervals so as to form a slightly flattened portion between each of these crowns. The flattened portions and the crowns in each of the rollers stand opposite each other as the rollers rotate, and the effect of this is that as the saw is passed between these rollers when the crowning portions arrive opposite each other, they exert a pressure upon the saw at the point where they compress it, which is equivalent to simultaneous blows of hammers upon opposite sides of the saw, the effect being to stretch the saw at the point where this pressure takes place, as previously described. As the rollers continue to revolve, the flattened portion next arrives opposite the saw, and at this point no pressure takes place upon the saw, and this leaves the intermediate lines of opposite tension. The next crowning portion of the rollers again grips the saw and exercises the same stretching effect upon it. By this action, when the saw has been first marked so as to show where the stretching is necessary, this portion is placed between the rollers which are closed down upon it, and the frames locked together, the apparatus is set in motion and the rollers travel over as much of the saw as is necessary to be stretched at this particular point. The saw can then be removed by separating the rollers and moved back again, this part being gone over until a sufficient amount of stretching has taken place which will be shown by a straight edge in the usual manner. In this manner the whole length of the saw can be gone over, and only such portions of the saw stretched as require it, the other portions being left as they are. In order to advance the saw continuously between these rollers, which will not have any gripping and feeding effect at the point where the flattened portions occur, we employ the elastic disks H which fit upon the arbors upon each side of the rollers, and are firmly clamped thereon by screw nuts I which are turned up against them. The peripheries of these disks extend a little beyond the crowning surfaces of the rollers so as to take a firm grip upon the saw when the latter is compressed between them, and they will insure the proper feed of the saw at all times when the rollers are rotated.

Having thus described our invention, what we claim as new, and desire to secure by Letters Patent, is—

1. A band saw stretching device consisting of rollers adapted to rotate in contact upon opposite sides of the saw blade when the latter is passed between them, said rollers being crowned in the center with the crowning surface depressed at intervals.

2. A device for stretching band saws consisting of rollers mounted upon arbors and having alternate crowned and depressed surfaces which meet each other upon opposite sides of the saw blade when the latter is passed between them, mechanism whereby said rollers are rotated in opposition to each other and elastic feed disks fixed upon the arbors adjacent to the rollers and adapted to grasp the saw blade.

In witness whereof we have hereunto set our hands.

WILLIAM HOLLINGSWORTH.
JOSEPH KORBEL.

Witnesses:
S. H. NOURSE,
J. A. BAYLESS.